Jan. 29, 1929.

G. C. GOODE 1,700,477

VIBRATION REDUCING MEANS

Filed Nov. 25, 1922

Inventor
Gilbert C. Goode
by
Thurston Kwis+Hudson
attys.

Patented Jan. 29, 1929.

1,700,477

UNITED STATES PATENT OFFICE.

GILBERT C. GOODE, OF EAST CLEVELAND, OHIO, ASSIGNOR TO THE WHITE MOTOR COMPANY, OF CLEVELAND, OHIO, A CORPORATION OF OHIO.

VIBRATION-REDUCING MEANS.

Application filed November 25, 1922. Serial No. 603,241.

The present invention relates to a device which is adapted for attachment to the frame of an automobile for the purpose of dampening vibration set up in the frame of the chassis due to the running of the internal combustion engine of the vehicle.

Figure 1:
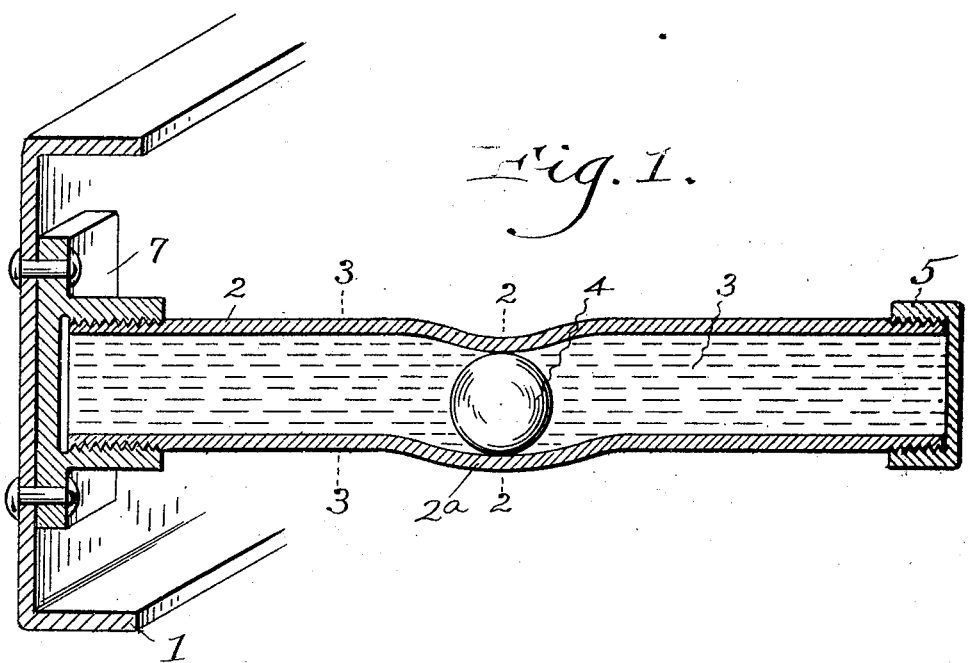
Figures 2, 3:

Reference should be had to the accompanying drawings forming a part of this specification, in which Fig. 1 shows a portion of the frame of a vehicle in perspective, and shows the device forming the present invention in section. Fig. 2 is a section on the line 2—2 of Fig. 1; Fig. 3 is a section on the line 3—3 of Fig. 1.

It is very well known that the frame of the chassis of a motor vehicle will absorb vibration due to the fact that the engine is mounted upon the chassis, and during the run the engine develops more or less vibration.

This vibration is largely taken up by the side members forming the frame and from these side members transferred to the body of the vehicle.

In the present invention 1 may designate a side member of the frame of an automobile chassis. Mounted upon the side member is a tube 2 which is filled with a fluid 3, such as oil, and immersed in this fluid is a spherical member 4, this spherical member or ball 4 being of a diameter to freely travel in the tube. The tube is adjacent the central portion provided with a depression $2^a$, so that the ball will normally, when not subject to vibration, be located in the depression $2^a$, as shown in Fig. 1 of the drawing.

In the construction shown the tube 2 is closed at its outer end by means of a cap 5 and at its inner end is threaded into the neck of a standard 7 which forms a mode of attachment to the side member of the frame of the vehicle.

The controlling feature in the present construction is the provision of the tube filled with liquid in which a ball is placed with one end of the tube fastened to the vibrating body and extending at right angles thereto with the opposite end free and unsupported.

This device is placed on the side member or side members, as may be desired, of a motor vehicle, at any convenient place, preferably at a point just behind the usual place for mounting the transmission housing.

In operation when vibration is set up in the side member this vibration is imparted to the tubes 2 and causes a movement of the ball 4 through the liquid material 3, which movement tends to dampen vibration in the tube 2 as well as in the side member 1.

Having described my invention, I claim:—

1. The combination with a frame member subject to vibration, of a vibration dampening device secured to said member and extending substantially at right angles therefrom, said device containing a body of fluid and having a movable part controlled by movements imparted to the fluid for the purpose of counteracting vibration.

2. The combination with a member subject to vibration, of a tubular member containing a liquid material and a movable body, said tubular member being secured at one end to the member subject to vibration and at its opposite end being free and unsupported.

3. The combination with a member subject to vibration, of a tubular member which is filled with liquid material and has a spherical member in the liquid, said tubular member being secured at one end to the member subject to vibration and extending at substantially right angles thereto.

In testimony whereof, I hereunto affix my signature.

GILBERT C. GOODE.